United States Patent
Simmons et al.

[15] 3,689,677
[45] Sept. 5, 1972

[54] METHOD FOR CONTROLLING STRIPE SMUT

[72] Inventors: James Almy Simmons, 430 Hickory Drive; Robert Joseph Bell, Route No. 2, both of Marysville, Ohio 43040

[22] Filed: Sept. 4, 1969

[21] Appl. No.: 855,382

Related U.S. Application Data

[63] Continuation-in-part of Ser. No. 568,132, July 27, 1966, abandoned.

[52] U.S. Cl. ............................. 424/349, 47/58, 71/3, 424/357
[51] Int. Cl. ................................. A01n 9/20
[58] Field of Search ........................................ 424/349

[56] References Cited

UNITED STATES PATENTS

| | | |
|---|---|---|
| 1,947,926 | 2/1934 | Steindorff et al. .......... 424/349 |
| 2,519,317 | 8/1950 | Kolka et al. ............. 424/349 X |
| 2,590,054 | 3/1952 | Taylor et al. ..................... 71/3 |
| 2,700,011 | 1/1955 | Taylor ......................... 424/40 |
| 2,887,433 | 5/1959 | Swank, Jr. .................. 424/268 |
| 3,076,699 | 2/1963 | Renner ......................... 71/2.4 |
| 3,083,089 | 3/1963 | Renner ......................... 71/97 |
| 3,632,328 | 1/1972 | Gaskin et al. .................... 71/3 |

FOREIGN PATENTS OR APPLICATIONS

| | | |
|---|---|---|
| 461,464 | 2/1937 | Great Britain ................... 71/3 |

*Primary Examiner*—Albert T. Meyers
*Assistant Examiner*—Dale R. Ore
*Attorney*—Strauch, Nolan, Neale, Nies and Kurz

[57] ABSTRACT

The control of stripe smut by the post-emergence application of 2,3,4,5,6-pentachloro-1-nitrobenzene to a turf area.

4 Claims, No Drawings

METHOD FOR CONTROLLING STRIPE SMUT

The present application is a continuation-in-part of application Ser. No. 568,132 filed July 27, 1966 (now abandoned).

This invention relates to the elimination of stripe smut from and the prevention of the smut in vegetated areas. More particularly, this invention relates to methods of controlling stripe smut (*Ustilago striiformis*) in emerged or mature grass and compositions employed therefor.

Although smuts have been in existence beyond man's records, they have not been especially destructive to grasses existing in the wild state. As with any crop, however, when a grass is grown under cultivation in pure stands, certain of its diseases are accentuated and cause serious problems. Smut is such a disease.

The disease has been recorded on Kentucky bluegrass, fescues, redtop, and many other grasses. And, in recent years, stripe smut has been reported increasingly on such popular varieties of grass as Merion bluegrass.

Grass infected with stripe smut is more susceptible to drought injury and other disease than uninfected grass. Often plants become so weakened they cannot survive periods of stress, such as winter or drought. The disease cause unsightly damage and kills complete patches of turf.

As pointed out in GUIDE FOR THE CHEMICAL CONTROL OF TURFGRASS DISEASES AND TURFGRASS WEEDS, CIRCULAR 1034, Virginia Polytechnic Institute Jan., 1967), there is no known chemical control for stripe smut. Accordingly, available methods of stripe smut control are of the preventive type (development of resistant varieties, seed treatment, and crop rotation) or involve destruction of the infected plants by fire or mulching or by plowing them under.

Stripe smut can be spread by wind or rain and infect succulent or rapidly growing plant parts. In lawns and other cultivated turf the spreading of spores mechanically by foot traffic, mower blades and other lawn equipment is added to the natural spreading by wind and water. The disease can also be transmitted through soil on which smut spores have fallen. Smut spores have great viability and can like up to several years in the soil. Accordingly, seed treatment typically proves to be of little lasting value in turfs since a turf can become infected through one of the mechanisms described above irrespective of whether the seed used to establish the turf is treated.

Development of resistant varieties is an approach which has shown some promise. However, this is by no means an all-embracing solution to the problem of controlling stripe smut. For example, it offers nothing in the case of existing turfs which are established from susceptible varieties.

The other methods used to control smut described above cannot be used effectively to control smut in turfs since the prior art methods require elimination of the infected plants; and turf-grasses are perennials, which makes destruction of the turf to eliminate the disease impractical. Heretofore, therefore, once turf had become infected with stripe smut there was no satisfactory method of eliminating the disease.

It has now been unexpectedly found that stripe smut in emerging and mature grass plants can be effectively controlled and eliminated by applying 2,3,4,5,6-pentachloro-1-nitrobenzene to the turf area, either before or after the disease appears, i.e., as a preventive or as a remedial measure. There is no need of burning, turning under or otherwise destroying the infected plants.

2,3,4,5,6-Pentachloro-1-nitrobenzene is a known fungicide which has been employed heretofore as a seed dressing. That this compound exhibits activity on stripe smut when applied to an infected ares is surprising, however, since other fungicides which are effective when employed as seed treating agents are uniformly ineffective when employed in accord with the principles of the present invention. For example, all of the following compounds will control wheat smut (Tilletia Caries) when used as seed dressings; but non of them will control stripe smut when applied to an infected area:

Chemagro 2635 (Dinitrotrichlorobenzene)
Captan (N-trichloromethylthio-4-cyclohexene-1,2-dicarboximide)
Dyrene (2,4-trichloro-6-(0-chloroanilino)-s-triazine)
Ferbam (Ferric dimethyl dithiocarbamate)
Daconil (Tetrachloroisophthalonitrile)
Thiram (Bis-(dimethylthiocarbamoyl)-disulfide)
Ceresan (Ethyl mercury salt)
Panogen (Cyano(methylmercuri)guanidine)

Moreover, according to the literature, 2,3,4,5,6-pentachloro-1-nitrobenzene by itself is not as effective fungus control when it is used in the manner contemplated by applicants; i.e., by applying it to a smut-infected area. Specifically, U.S. Pat. No. 2,887,433 to Swank offers some evidence that this compound is an effective control for large brown patch (*Rhizoctonia solani*) when applied to an infected area in combination with cycloheximide (B-[2-(3,5-dimethyl-2-oxocyclohexyl)-2-hydroxyethyl]-glutarimide). However, in tests reported by Kendrick et al. and referred to in the Swank patent, (The Efficacy of Certain Chemicals as Fungicides for a Variety of Fruit, Root and Vascular Pathogens, PLANT DISEASE REPORTER, Vol. 38, No. 5 (5–15–1954)) 2,3,4,5,6-pentachloro-1-nitrobenzene applied by itself as a soil drench to soil containing this same disease, *Rhizoctonia solani*, was inactive.

Furthermore, the literature indicates that, to be effective against stripe smut, a fungicide must be of the systemic type (see, for example, Systemic Fungicides for Stripe Smut by J. R. Hardison, WEEDS, TREES AND TURF, May, 1967). There is no evidence that 2,3,4,5,6-pentachloro-1-nitrobenzene is a systemic fungicide. Accordingly, it is surprising that this compounds has proven to be an effective stripe smut control.

In conjunction with the foregoing, in the present invention, the 2,3,4,5,6-pentachloro-1-nitrobenzene is applied to the area in which control of the smut is desired at a rate in the range of 1 to 2 pounds per 1,000 square feet or higher (as will become apparent hereinafter, rates as high as 4 pounds per 1,000 square feet have been successfully employed). It is surprising both that such high rates are required to provide control and that such rates can be employed.

With respect to the first of the points just made recommended application rates for commercially available turf fungicides do not exceed eight ounces of active compound per 1,000 square feet (see GUIDE FOR THE CHEMICAL CONTROL OF TURFGRASS DISEASES AND TURFGRASS WEEDS, cited above). It is most unusual to find, as applicants have, that fungicidal activity is exhibited only at rates two to eight times the maximum rates specified for other turf fungicides.

As to the second of the foregoing points, it has heretofore been reported that chlorinated nitrobenzenes are phytotoxic to the more widely used turfgrasses such as fescue and bluegrass at rates which are much lower than those employed by applicants. For example, Couch et al (Chemical Control of Melting-out of Kentucky Bluegrass, PLANT DISEASE REPORTER, Vol 41, No. 3 (3–15–57)) state that 2,3,4,5,6-pentachloro-1-nitrobenzene is extremely phytotoxic to Illahee fescue at rates as low as 4 ounces per 1,000 square feet, and Couch also found that trichlorodinitrobenzene was extremely phytotoxic to Merion Kentucky Bluegrass at rates of only 9 ounces per 1,000 square feet (RESULTS OF 1961–62 PENN STATE TRUFGRASS FUNGICIDE TRIALS (unpublished)). In direct contrast to these findings applicants have discovered that 2,3,4,5,6-pentachloro-1-nitrobenzene can be safely applied to turfgrasses at the much higher rates specified above when applied in accord with the principles of the present invention.

In conjunction with the foregoing the Swank patent identified above discloses a maximum application rate of 2.12 ounces per 1,000 square feet for 2,3,4,5,6-pentachloro-1-nitrobenzene as a potentiating agent. At this rate the compound in question of course exhibits no control of stripe smut.

The 2,3,4,5,6-pentachloro-1-nitrobenzene may be applied to the plants in any convenient form. For example, it may be dissolved or emulsified in a solvent and sprayed on the area to be treated. Or, it may be combined with a diluent and/or other adjuvants to make a dust and applied with conventional dusting equipment. It may also be formulated with a granular carrier and applied with conventional granular spreaders.

Suitable carriers for spray formulations of the 2,3,4,5,6-pentachloro-1-nitrobenzene include organic solvents, oils, and water while those satisfactory for granular formulations include vermiculite, perlite, diatomaceous earth, clays and corn cobs as well as the other carriers listed in HANDBOOK OF INSECTICIDE DUST DILUENTS AND CARRIERS (2d Ed.), Watkins et al, Dorland Brooks, Caldwell, N. J., 1955), which is hereby incorporated by reference.

Diluents, stabilizers, surfactants, plant nutrients, other pesticides, flow enhancing agents, adhesives, dyes, and other adjuvants may also be employed to produce formulations which may be safely handled and are convenient to apply uniformly and in accurate quantities to the area to be treated. These and other adjuvants which may be employed are described in CHEMISTRY OF THE PESTICIDES (3d Ed.), Frear, D. Van Nostrand Company, Inc., New York, N. Y., 1955, and in WEED CONTROL (2d Ed.), Robbins et al., McGraw-Hill Book Company, Inc., New York, N. Y., 1952, which are also incorporated by reference herein.

From the foregoing it will be apparent that one important object of the present invention is the provision of novel, improved methods for effectively destroying stripe smut.

A related object of the present invention resides in the provision of methods of controlling stripe smut without destroying desirable vegetation.

Another specific object of the present invention resides in novel, improved methods of eradicating stripe smut in which 2,3,4,5,6-pentachloro-1-nitrobenzene is applied.

Yet another important object of this invention is the provision of novel, improved compositions for the chemical control of stripe smut.

Other objects and novel features and further advantages of the present invention and the nature of the invention will become fully apparent from the following examples in which all parts are parts by weight unless otherwise indicated. These examples are primarily for the purpose of illustration, and any specific enumeration or details contained therein should not be interpreted as limitations on the appended claims unless expressly recited in the claims.

EXAMPLE I

A granular formulation containing 2,3,4,5,6-pentachloro-1-nitrobenzene was applied to Kentucky bluegrass turf heavily infected with stripe smut. A granular spreader was used to distribute the composition. Similar smut-infected turf was left untreated as a comparative check. The granular composition had the following formula:

| Ingredients | Parts by weight |
| --- | --- |
| Vermiculite | 5000 |
| Hexylene Glycol | 1124 |
| 20–80 Green Dye | 9 |
| 2,3,4,5,6-Pentachloro-1-nitrobenzene | 6133 |

The indicated number of applications of 2 pounds of 2,3,4,5,6-pentachloro-1-nitrobenzene per 1,000 square feet of turf area were made at intervals over a 5-month period. Six months after the initial application, percentages of plants infected with smut and percentages of smut control were calculated using untreated turf as standards. The results are tabulated below.

| Number of Applications | Total pounds of 2,3,4,5,6-pentachloro-1-nitrobenzene applied per 1000 sq.ft. of turf area | % of Plants Infected with Stripe Smut | % Control of Stripe Smut |
| --- | --- | --- | --- |
| 1 | 2 | 2 | 95 |
| 2 | 4 | 2 | 95 |
| 6 | 12 | 0 | 100 |
| 7 | 14 | 0 | 100 |
| 8 | 16 | 0 | 100 |
| Untreated turf | 0 | 40 | 0 |

EXAMPLE II

Single applications of the granular 2,3,4,5,6-pentachloro-1nitrobenzene formulations tabulated below were made with a granular spreader to Kentucky bluegrass turf infected with stripe smut.

| Ingredient | Formulation—Parts by Weight | | | | |
| --- | --- | --- | --- | --- | --- |
| | A | B | C | D | E |

| | | | | | |
|---|---|---|---|---|---|
| Vermiculite | 5000 | 5000 | 1236 | 867 | 1307 |
| 20-8-8 (N - P₂O₅ - K₂O analysis) granular fertilizer | | | 5000 | 5000 | 5000 |
| Hexylene Glycol | 1124 | 609 | 724 | 724 | 724 |
| 28% Ammonium Hydroxide | | 11 | 21 | 21 | |
| 95% Phenylmercuric Acetate | | 45 | 43 | 43 | |
| 99% Tetramethylthiuram Disulphide | | | | 278 | |
| Dye | 9 | 9 | 12 | 12 | 12 |
| 2,3,4,5,6-Pentachloro-1-nitrobenzene | 6133 | 3066 | 2963 | 2963 | 2963 |

The following similar formulation with 2,3,4,5,6-pentachloro-1-nitrobenzene was applied to the smut-infected Kentucky bluegrass for a comparison.

| Ingredients | Parts by Weight |
|---|---|
| Vermiculite | 5000 |
| Hexylene Glycol | 609 |
| 28% Ammonium Hydroxide | 11 |
| 95% Phenylmercuric Acetate | 45 |
| 99% Tetramethylthiuram Disulphide | 287 |

Recorded below is the percentage of smut control effected with the various formulations. First, second, and third readings were taken at 30, 34, and 116 days respectively after application.

| Formula | Lbs of 2,3,4,5,6-pentachloro-1-nitrobenzene per 1000 sq. ft. | % Smut Control First Reading | Second Reading | Third Reading |
|---|---|---|---|---|
| A | 1 lb | 20 | 67 | 80 |
| A | 2 lb | 20 | 73 | 80 |
| A | 4 lb | 20 | 73 | 80 |
| B | 1 lb | 20 | 67 | 80 |
| C | 1 lb | 20 | 67 | 80 |
| D | 1 lb | 20 | 73 | 80 |
| E | 1 lb | 40 | 73 | 80 |
| F | 0 lb | 0 | 0 | 0 |
| 23-7-7 (N - P₂O₅ - K₂O analysis) fertilizer | 0 lb | 0 | 0 | 0 |
| untreated turf | 0 lb | | 0 | 0 |

EXAMPLE III

Application of Formulation E were made with a granular spreader at the rate of 1 pound of 2,3,4,5,6-pentachloro-1-nitrobenzene per 1,000 square feet periodically to Kentucky blue-grass heavily infected with stripe smut. Kentucky bluegrass similarly infected was left untreated as a comparative check. The table below indicates the number of applications made and percent control of stripe smut obtained using the untreated turf as a standard.

| Number of Applications | Total pounds of 2,3,4,5,6-pentachloro-1-nitrobenzene per 1000 sq. ft. | % Smut Control |
|---|---|---|
| 1 | 1 | 17% |
| 4 | 4 | 100% |
| 6 | 6 | 100% |
| 8 | 8 | 100% |
| Untreated Turf | 0 | 0% |

The foregoing examples establish that 2,3,4,5,6-pentachloro-1-nitrobenzene not only prevents the spread of stripe smut in turf but also eliminates smut already established in turf.

EXAMPLE IV 2,3,4,5,6-pentachloro-1-nitrobenzene can be heavily applied to lawns at the same time as they are seeded without inhibiting seed germination, which is of course highly advantageous. This is shown by the data tabulated below. In the tests in which this data was obtained, Formulation A was applied to soil at the indicated rates and the soil then sown with Kentucky bluegrass seed. Forty-three days later percentage of stand, or germination was calculated using seed sown in soil to which 2,3,4,5,6-pentachloro-1-nitrobenzene was not applied as a standard.

| Rate-pounds of 2,3,4,5,6-pentachloro-1-nitrobenzene per 1000 sq.ft. | Percent Stand |
|---|---|
| 2 | 95 |
| 4 | 95 |
| 6 | 95 |
| 0 | 100 |

EXAMPLE V

The following data from tests in which Formulation A was applied to Kentucky bluegrass at the indicated rates establishes that 2,3,4,5,6-pentachloro-1-nitrobenzene is not antagonistic to the growth and development of turfgrass. Readings were taken approximately five months after the initial applications. Percentages are given in the zero level of 2,3,4,5,6-pentachloro-1-nitrobenzene.

| Rate-pounds of 2,3,4,5,6-pentachloro-1-nitrobenzene per 1000 sq.ft. | % Density | % Root Growth |
|---|---|---|
| 1 | 127 | 105 |
| 3 | 109 | 98 |
| 5 | 97 | 87 |
| 7 | 98 | 93 |
| 0 | 100 | 100 |

The preceding two tables show that 2,3,4,5,6-pentachloro-1-nitrobenzene, even when profusely applied, does not adversely affect the growth and development of Kentucky bluegrass nor the germination of seed.

EXAMPLE VI

Another important advantage of the present invention is that the 2,3,4,5,6-pentachloro-1-nitrobenzene has a high degree of residuality. This is shown by tests in which applications of Formulation E were made with a granular spreader at the rate of 1 pound of 2,3,4,5,6-pentachloro-1-nitrobenzene per 1,000 sq. ft. periodically to Kentucky bluegrass heavily infected with stripe smut. Kentucky bluegrass simularly infected was left untreated as a comparative check. Readings were taken 384 days after the initial application. The table below indicates the number of applications made and the percent control of stripe smut obtained using the untreated turf as a standard. Also given below are percentages of turf density given in the zero level of 2,3,4,5,6-pentachloro-1-nitrobenzene.

| No Applications | Rate of 2,3,4,5,6-pentachloro-1-nitrobenzene—lbs/acre | % Density | % Control |
|---|---|---|---|

| 1 | 1 lb  | 277 | 83  |
| 2 | 2 lbs | 428 | 83  |
| 4 | 4 lbs | 383 | 85  |
| 8 | 8 lbs | 409 | 95  |
| 0 | 0     | 100 | 0   |

As shown by the data in the foregoing table, even a slight light application of 2,3,4,5,6-pentachloro-1-nitrobenzene may be effective to control stripe smut for periods in excess of 1 year.

The following examples are illustrative of further specific 2,3,4,5,6-pentachloro-1-nitrobenzene compositions contemplated by the present invention.

EXAMPLE VII

| Ingredient | Parts by Weight |
| --- | --- |
| 25–0–0 (N - $P_2O_5$ - $K_2O$ analysis) granular fertilizer | 5000 |
| Hexylene Glycol | 127 |
| 20–80 Green Dye | 2 |
| 2,3,4,5,6-Pentachloro-1-nitrobenzene | 625 |

EXAMPLE VIII

| Ingredient | Parts by Weight |
| --- | --- |
| Vermiculite | 5000 |
| Hexylene Glycol | 510 |
| 20–80 Green Dye | 8 |
| 2,3,4,5,6-Pentachloro-1-nitrobenzene | 696 |

EXAMPLE IX

| Ingredient | Parts by Weight |
| --- | --- |
| 21.0–4.5–4.5 (N - $P_2O_5$ - $K_2O$ analysis) granular fertilizer | 5000 |
| Vermiculite | 1510 |
| Polybutene | 216 |
| 2,3,4,5,6-Pentachloro-1-nitrobenzene | 777 |

The following examples illustrate exemplary methods of preparing the formulations such as those described in Examples 1–9.

EXAMPLE X

Formulation of Formula D (Example II)

Twenty-four millimeters of 28 percent ammonium hydroxide was blended 12 grams of 20–80 green dye and 800 milliliters of hexylene glycol. To this mixture was added 44.1 grams of 95 percent phenylmercuric acetate. Blending was continued until a suspension was formed. The resulting suspension was sprayed onto a previously thoroughly mixed combination of 11.25 pounds of 20–8–8 (N — $P_2O_5$ — $K_2O$ analysis) fertilizer prepared as described in U.S. Pat. No. 3,076,700, *Fertilizer Compositions and Process*, 1.95 pounds of No. 4 expanded vermiculite, 283.5 grams of 99 percent tetramethylthiuram disulfide and 3,024 grams of 2,3,4,5,6-pentachloro-1-nitrobenzene to form a granular, dust-free material having a final N — $P_2O_5$ — $K_2O$ analysis of 10–4–4.

EXAMPLE XI

Formulation of Example VIII

Twelve hundred milliliters of hexylene glycol and 18 grams of 20–80 green dye were blended together. The resulting blend was sprayed onto a previously thoroughly mixed combination of 4,800 cubic inches of No. 4 expanded vermiculite and 1,512 grams of 2,3,4,5,6-pentachloro-1-nitrobenzene to form a granular, dustfree composition.

EXAMPLE XII

Formulation of Example IX

Fifteen-hundred twelve grams of 2,3,4,5,6-pentachloro-1-nitrobenzene, 6.48 pounds of No. 4 expanded vermiculite and 21.45 pounds of 2.10–4.5–4.5 (N — $P_2O_5$ — $K_2O$ analysis) fertilizer prepared as described in U.S. Pat. No. 3,076,700, *Fertilizer Compositions and Process*, were thoroughly mixed together. Two hundred sixteen milliliters of polybutene (currently available as "Polyvis OSH" from Cosden Oil and Chemical Company) was sprayed onto the resulting mixture to form a granular, dust-free material having a final N — $P_2O_5$ — $K_2O$ analysis of 14–3–3.

As will be obvious to those skilled in the arts to which this invention relates, the proportions of the ingredients in the various formulations disclosed herein may be varied for various applications of the present invention. The following table lists the preferred proportions of ingredients for granular compositions and granular compositions containing plant food or nutrients:

| Ingredients | Parts by Weight |
| --- | --- |
| Granular Fungicidal Compositions | |
| Carrier | 5000 |
| Solvent* | 510–1124 |
| Dye | 0–9 |
| 2,3,4,5,6-pentachloro-1-nitrobenzene | 696–6133 |

*The solvent may include or be a sticking agent such as polybutene or hexylene glycol or another of the sticking agents disclosed in U.S. Pat. Nos. 3,076,700 and 3,083,089, which are hereby incorporated by reference.

| Ingredients | Parts by Weight |
| --- | --- |
| Granular Fungicidal — Fertilizer Compositions | |
| Granular Fertilizer* | 5000 |
| Carrier | 0–1510 |
| Solvent** | 127–724 |
| Dye | 0–12 |
| 2,3,4,5,6-pentachloro-1-nitrobenzene | 625–2963 |

*Formulations containing both 2,3,4,5,6-pentachloro-1-nitrobenzene and plant nutrients are particularly efficacious in developing and maintaining a healthy smut-free turf and eliminate the necessity of separately applying the plant nutrients and 2,3,4,5,6-pentachloro-1-nitrobenzene to the turf area. The plant nutrients do not have to be provided by the particular type of fertilizer described above, it being important only that the fertilizer which is used be one containing plant available nitrogen. A number of suitable fertilizers of this type are described in COMMERCIAL FERTILIZERS (5th Ed.), Collings, McGraw-Hill Book Co., Inc., New York, N.Y. (1955) which is hereby incorporated by reference herein.
**The solvent may include or be a sticking agent such as poly-butene or hexylene glycol or another of the sticking agents disclosed in U.S. Pat. Nos. 3,076,699 and 3,083,089.

As discussed above, the formulations disclosed herein are preferably applied at rates providing from about 1 to about 2 pounds or more of 2,3,4,5,6-pentachloro-1-nitrobenzene per 1,000 square feet of turf per application. One and preferably two applications per year will prevent stripe smut from becoming established. One application per year of 2,3,4,5,6-pentachloro-1-nitrobenzene will generally control the smut in lightly infected areas and two applications in heavily infected areas; unusual situations may of course dictate additional applications of this compound.

This invention may be embodied in other specific forms with departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. The process of controlling stripe smut in an area having plants therein, comprising the step of applying to said area after the emergence of said plants a stripe smut controlling amount of 2,3,4,5,6-pentachloro-1-nitrobenzene, said amount providing at least 1 pound of 2,3,4,5,6-pentachloro-1-nitrobenzene per 1,000 square feet.

2. A process of controlling stripe smut as defined in claim 1, in which not more than 4 pounds of 2,3,4,5,6-pentachloro-1-nitrobenzene is applied per 1,000 square feet.

3. The process of claim 1, wherein the application is repeated at periodic intervals.

4. The process of claim 1, together with the step of seeding the treated area.

* * * * *

UNITED STATES PATENT OFFICE
CERTIFICATE OF CORRECTION

Patent No. 3,689,677           Dated September 5, 1972

Inventor(s) James Almy Simmons and Robert Joseph Bell

It is certified that error appears in the above-identified patent and that said Letters Patent are hereby corrected as shown below:

Column 1, line 26, change "cause" to -- causes --.

Column 1, line 32, after "institute" insert -- ( --.

Column 1, line 46, change "like" to -- live --.

Column 2, line 9, change "ares" to -- area --.

Column 2, line 15, change "non" to -- none --.

Column 2, line 54, change "compounds" to -- compound --.

Column 5, line 12, change "with" to -- without --.

Column 5, line 41, 1st column delete "0 lb" and insert in 2nd column; 3rd column insert -- 0 --.

Column 6, line 11, insert comma after "germination".

Column 6, line 30, change "applications" to -- application --.

Column 7, line 9, change "slight" to -- single --.

Column 7, line 21, in formula, "P" should be -- $P_2$ --.

Column 9, line 13, change "with" to -- without --.

Column 10, claim 2, line 2, after "than" insert -- about --.

Signed and sealed this 6th day of March 1973.

(SEAL)

Attest:

EDWARD M. FLETCHER, JR.
Attesting Officer

ROBERT GOTTSCHALK
Commissioner of Patents